UNITED STATES PATENT OFFICE.

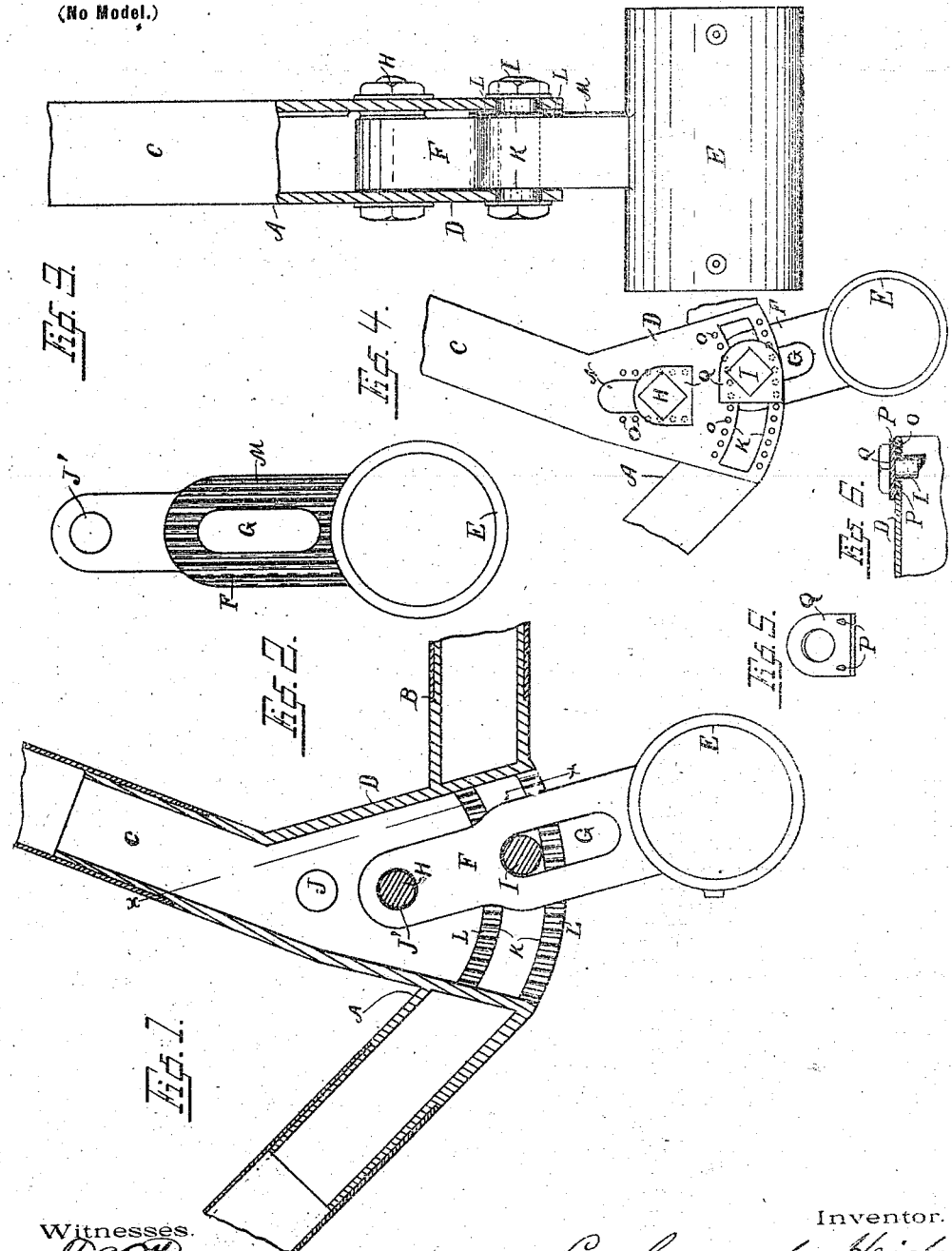

CARL VON DER HEIDE, OF MILWAUKEE, WISCONSIN.

BICYCLE.

SPECIFICATION forming part of Letters Patent No. 651,907, dated June 19, 1900.

Application filed August 2, 1899. Serial No. 725,888. (No model.)

*To all whom it may concern:*

Be it known that I, CARL VON DER HEIDE, a citizen of the United States, residing at Milwaukee, in the county of Milwaukee and State of Wisconsin, have invented new and useful Improvements in Bicycles, of which the following is a specification.

My invention relates to improvements in bicycles.

The object of my invention is to provide means for raising or lowering the crank-bearing or adjusting the same longitudinally with reference to the frame, whereby said adjustment may be used for the threefold purpose of regulating the tension of the chain, raising or lowering the crank-bearing with reference to the track or roadway, and increasing or diminishing the distance between the crank-bearing and the saddle.

It will be understood that the so-called "drop-frame" or frame with a low crank-bearing is desirable for use in cities or wherever the roads are smooth and free from obstacles, while for country roads, especially in places where the roads are uneven or filled with ruts or covered with stone, it is desirable that the crank-bearing should be located at a higher level in order that the pedals will not strike obstructions. It will also be understood that it is desirable that the height of the frame shall conform to the length of limb of the rider and that where the same bicycle is used by different riders it frequently becomes necessary to adjust the saddle-post at such a height that the rider incurs considerable risk due to the danger that the long leverage exerted by the saddle-post will fracture such post or the upper frame-post of the bicycle. Hence a vertical adjustment of the crank-bearing whereby the distance between the pedals and saddle is increased without altering the position of the saddle with respect to the frame is especially desirable.

In the following description reference is had to the accompanying drawings, in which—

Figure 1 is a sectional view of the lower frame-joint of a bicycle, drawn on the axis of the frame-tubes and showing my invention applied thereto. Fig. 2 is a detail view showing the crank-bearing box and its supporting-arm. Fig. 3 is a sectional view drawn on line *x x* of Fig. 1. Fig. 4 is a side view of the lower frame-joint, showing my invention applied thereto and showing the saddle-post frame-rod provided with a slot to facilitate the adjustment of the crank-bearing box. Fig. 5 is a detail view of the clamping-plate. Fig. 6 is a sectional view of the same, illustrating the engagement of the studs in the holes of the part D.

Like parts are identified by the same reference-letters throughout the several views.

A is the lower head-rod of my improved bicycle.

B is one of the rods of the crank-hanger fork, which extends to the rear axle, and C is the saddle-post frame-rod or central stay. The rod C at its lower end B is flattened at the sides and spread in the longitudinal plane of the frame, so as to form a fan-shaped socket or recess, in which the crank-hanger supporting-arm is secured, as hereinafter explained.

E is the crank-bearing box or sleeve, the interior of which may be of any ordinary construction. The sleeve E is provided with an arm or shank F, having a slot G, and adapted to be inserted in the socket formed in the part D of the saddle-post rod or central stay C of the bicycle-frame, in which it is secured by means of bolts H and I, respectively, the latter passing through the slot G.

It will be observed that the part D is provided with a plurality of bolt-holes J, through any one of which the bolt H may be inserted, for the purpose of securing the upper end of the shank F, the slot G being adapted to permit the shank F to move perpendicularly, so that the bolt-hole J' in the upper end of said shank may be made to register in any of the openings J in the part D. It will also be observed that the lower end of the part D is provided with a slot K, on each side of which are interiorly-projecting ribs or flanges L, which are milled or notched and adapted to engage a similarly notched or milled portion M of the shank F when the parts are secured together by means of the bolt I. The sides of the part D will yield sufficiently to permit the ribs L to be clamped firmly upon the opposing surface M of the shank F.

In Fig. 4 I have shown a form of construction in which a slot N is provided in the part D instead of the bolt-holes J. With this construction it is obvious that any desired vertical adjustment of the crank-bearing box or sleeve may be effected without removing either of the bolts H or I, it being merely necessary to loosen them in order to permit the shank F to be moved to the desired position of adjustment. In this figure I have also shown the part D provided with a series of apertures or holes O adjacent to the slots K and N, in which studs P, carried by a clamping-plate Q, are adapted to engage. The plates Q are located on the bolts in the same manner as an ordinary washer.

When it is merely desired to adjust the chain, the lower bolt I is loosened, and the crank-bearing or box E is then swung to the front or rear upon the bolt H as a pivot and held in the newly-adjusted position by again tightening the bolt I to clamp the shank between the ribs L. On the other hand, when it is desired to adjust the crank-bearing vertically both bolts are loosened, the bolt H being removed when the construction shown in Fig. 1 is used, and the shank F is then moved to the desired position and the bolts replaced and tightened.

Having thus described my invention, what I claim as new, and desire to secure by Letters Patent, is—

1. The combination of a bicycle-frame, provided with a fan-shaped socket or recess in the crank-hanger joint, and slots communicating laterally between said socket and the exterior; a crank-bearing sleeve or box, provided with a slotted shank adapted to enter said socket; means for securing said shank in the socket, in various positions of vertical adjustment; and a securing-bolt passing through the slots in the frame-joint and through the shank, whereby the latter may be secured in various positions of longitudinal adjustment.

2. The combination, with a bicycle-frame, provided with a socket or recess in the crank-hanger joint; of a crank-bearing sleeve or box provided with a shank adapted to enter said socket or recess in the frame; a pivot-bolt adapted to secure the upper end of said shank in various positions of vertical adjustment, and a securing-bolt passing through a slot in the recessed portion of the frame, and adapted to clamp the sides of the recess upon said shank.

3. The combination with a bicycle-frame of a crank-bearing sleeve or box provided with a shank adapted to enter a recess or socket in the frame, the socketed portion of the frame being provided with slots crossing a slot in the shank; a pivot-bolt adapted to hold the upper end of said shank in various positions of vertical adjustment; and a clamping-bolt adapted to be inserted through said slots to bind the parts together.

4. The combination with a bicycle-frame, of a crank-bearing sleeve or box provided with a shank adapted to enter a recess or socket in the frame; clamping-ribs located on the interior surface of said socket; and a clamping-bolt adapted to bind said ribs upon the shank, the opposing surfaces of the shank and ribs being milled or notched, substantially as set forth.

In testimony whereof I have hereunto set my hand this 27th day of July, 1899.

CARL VON DER HEIDE.

Witnesses:
LEVERETT C. WHEELER,
A. MOELLER.